US011711496B2

(12) United States Patent
Stern et al.

(10) Patent No.: US 11,711,496 B2
(45) Date of Patent: Jul. 25, 2023

(54) WIRELESS CAMERA NETWORK

(71) Applicant: Tactacam LLC, Caledonia, MN (US)

(72) Inventors: Ben Stern, Holmen, WI (US); Jeff Peel, Decorah, IA (US); Ben Thorud, Holmen, WI (US)

(73) Assignee: TACTACAM LLC, Caledonia, MN (US)

( * ) Notice: Subject to any disclaimer, the term of this patent is extended or adjusted under 35 U.S.C. 154(b) by 0 days.

(21) Appl. No.: 15/594,216

(22) Filed: May 12, 2017

(65) Prior Publication Data

US 2017/0332051 A1    Nov. 16, 2017

Related U.S. Application Data

(60) Provisional application No. 62/335,854, filed on May 13, 2016.

(51) Int. Cl.
*H04N 7/18* (2006.01)
*H04N 5/04* (2006.01)
*F41C 27/00* (2006.01)
*F41B 5/14* (2006.01)

(52) U.S. Cl.
CPC .......... *H04N 7/181* (2013.01); *F41B 5/1492* (2013.01); *F41C 27/00* (2013.01); *H04N 5/04* (2013.01)

(58) Field of Classification Search
CPC ........ H04N 7/181; H04N 5/04; F41B 5/1492; F41C 27/00
USPC .......................................................... 348/159
See application file for complete search history.

(56) References Cited

U.S. PATENT DOCUMENTS

| | | | | |
|---|---|---|---|---|
| 9,497,380 B1* | 11/2016 | Jannard | ................ | H04N 13/189 |
| 2002/0106202 A1* | 8/2002 | Hunter | ................... | G08B 21/22 |
| | | | | 396/429 |
| 2013/0170482 A1 | 7/2013 | Jung | | |
| 2013/0293709 A1* | 11/2013 | Cha | .......... | H04N 9/79 |
| | | | | 348/143 |
| 2014/0092254 A1* | 4/2014 | Mughal | .......... | H04N 21/234381 |
| | | | | 348/158 |
| 2014/0269646 A1 | 9/2014 | Pamasamy | | |
| 2015/0195324 A1* | 7/2015 | Kim | ..................... | H04L 65/607 |
| | | | | 709/219 |
| 2015/0324636 A1* | 11/2015 | Bentley | ................... | A63F 13/00 |
| | | | | 386/227 |
| 2016/0021292 A1* | 1/2016 | Zhang | ...................... | H04N 5/06 |
| | | | | 348/211.2 |
| 2016/0021329 A1* | 1/2016 | Sakiewicz | ................ | F41G 1/35 |
| | | | | 386/227 |
| 2016/0063105 A1* | 3/2016 | Renkis | .................... | H04L 41/22 |
| | | | | 348/159 |
| 2016/0149716 A1* | 5/2016 | Raj | ...................... | H04L 12/2827 |
| | | | | 700/275 |
| 2016/0295172 A1* | 10/2016 | Cuddeback | ........ | H04N 1/00315 |
| 2016/0309123 A1* | 10/2016 | Edwards | ................ | G08B 13/00 |

(Continued)

*Primary Examiner* — Joseph G Ustaris
*Assistant Examiner* — Matthew David Kim
(74) *Attorney, Agent, or Firm* — McAndrews, Held & Malloy, Ltd.

(57) ABSTRACT

A wireless camera network is disclosed. The wireless camera network includes a first camera and one or more other cameras. After an input is received by the first camera, the first camera records images or video, and the first camera wirelessly transmits a start signal to one or more other cameras to also start recording images or video and to also wirelessly transmit the start signal.

9 Claims, 3 Drawing Sheets

(56) References Cited

U.S. PATENT DOCUMENTS

2017/0214982 A1* 7/2017 Cowherd ................. H04N 5/77
2018/0010882 A1* 1/2018 Soltys ..................... F41C 27/00

* cited by examiner

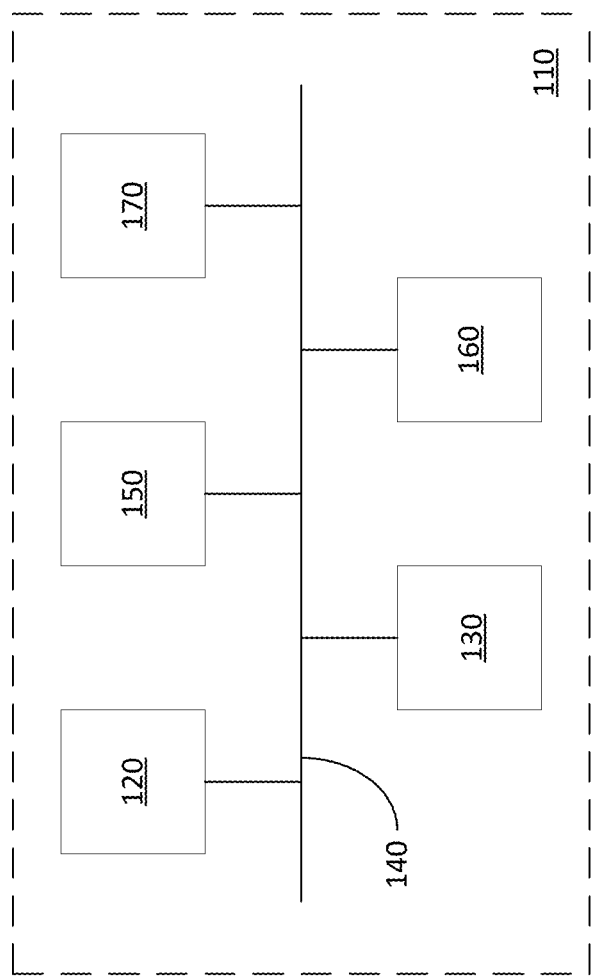

WIRELESS CAMERA NETWORK

CROSS-REFERENCE TO RELATED APPLICATIONS

The present application claims benefit from and priority to U.S. Application No. 62/335,854, filed May 13, 2016. The above-identified application is hereby incorporated by reference herein in its entirety.

BACKGROUND

Multiple cameras can record their own images or video. However, there is no coordination or synchronization between the multiple cameras, resulting in independent videos being recorded.

What is needed is a camera network that automatically coordinates multiple cameras for recording images or videos.

BRIEF SUMMARY

A wireless camera network is provided, substantially as illustrated by and/or described in connection with at least one of the figures, as set forth more completely in the claims.

BRIEF DESCRIPTION OF THE DRAWINGS

FIG. 3 shows an embodiment of some circuitry of the camera according to the present disclosure.

DETAILED DESCRIPTION

Some embodiments of the present disclosure relate to a wireless camera network.

Some embodiments of the present disclosure provide multiple cameras in which each camera can wirelessly communicate with any camera within its range. A first camera of the multiple cameras can be activated such that it activates other cameras within its range. Those cameras, in turn, can activate other cameras that might not be in range of the first camera. In some embodiments, the activation relates to the start of recording images and/or videos.

Figure 1:
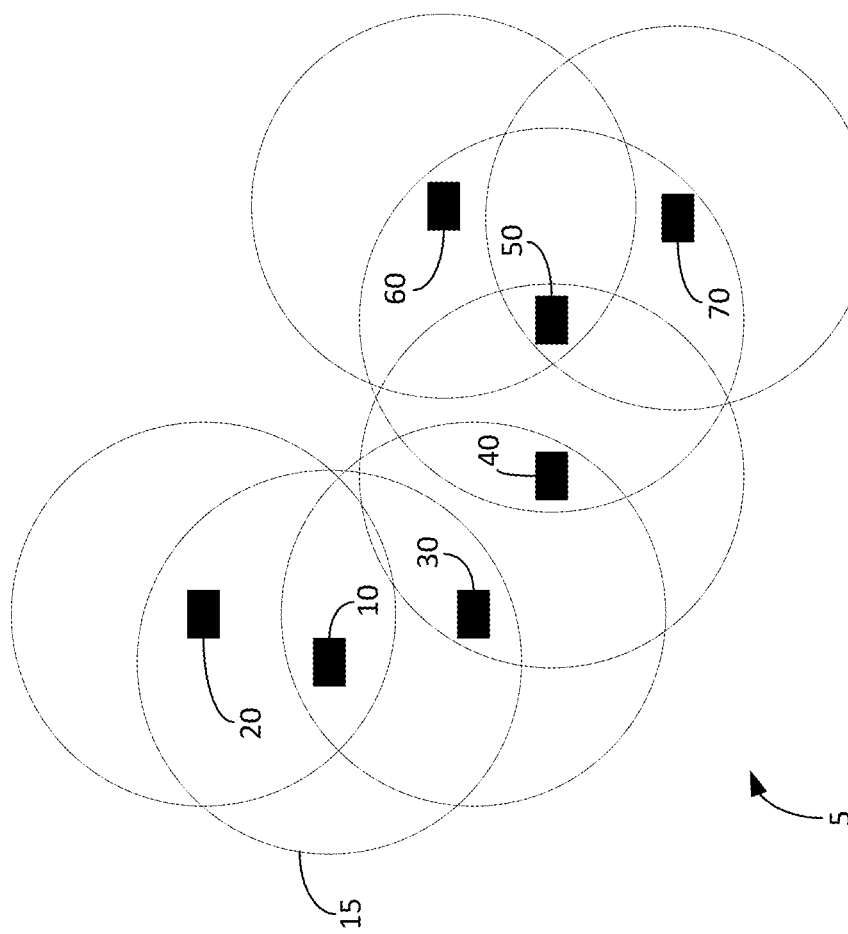
FIG. 1 shows an embodiment of a wireless camera network according to the present disclosure.

Referring to FIG. 1, an embodiment of a wireless camera network 5 is illustrated. The wireless camera network 5 can include, for example, a plurality of cameras 10, 20, 30, 40, 50, 60, and 70. Each camera has its own wireless range. For example, camera 10 has a wireless range 15. Camera 10 can communicate with other cameras within its wireless range 15. Thus, for example, referring to FIG. 1, camera 10 can directly communicate with cameras 20 and 30, but cannot directly communicate with cameras 40, 50, 60, and 70.

In some embodiments, each camera can have two wireless ranges. The first wireless range can be a transmitting range, which represents the range within which the camera can successfully transmit communications to another camera. The second wireless range can be a reception range, which represents the range within which the camera can successfully receive communications from another camera. In some embodiments, the transmitting range and the reception range is the same or approximately the same. In some embodiments, the transmitting range and the reception range are different. Discussions below will focus on the transmitting range and the reception range being the same or approximately the same; however, the discussions below can be modified, without straying from some embodiments of the present disclosure, in the case in which the transmitting range and the reception range are different.

In some embodiments, the cameras communicate wirelessly using one or more of the following wireless technologies: WiFi, IEEE 802.11, cellular, radio frequencies, microwave frequencies, infrared frequencies, ZigBee, Bluetooth, wireless local area network, wireless personal area network, wireless mesh network, etc.

In operation, when a button or some other input is actuated in camera 10, then camera 10 starts to record images or video. Camera 10 then wirelessly transmits (e.g., a wirelessly broadcasts) a start signal that is received by cameras 20 and 30 which are within the wireless range 15 of camera 10. Once cameras 20 and 30 receive the start signal from camera 10, cameras 20 and 30 start to record images or video. Cameras 20 and 30 wirelessly transmit start signals. No other cameras that are not already part of the growing wireless camera network 5 receive the start signal from camera 20. Camera 40 receives the start signal from camera 30. Camera 40 starts to record images or videos and wirelessly sends out a start signal which is received by camera 50. Camera 50 starts to record images or videos and wirelessly sends out a start signal which is received by cameras 60 and 70. Cameras 60 and 70 start to record images or videos and wirelessly send out start signals. No other cameras that are not already part of the wireless camera network 5 receives the start signals from cameras 60 and 70. Thus, by actuating a button or some other input on camera 10, a wireless camera network 5 can be formed that includes cameras 20, 30, 40, 50, 60, and 70.

Although camera 10 was the first camera to start recording, any of the cameras could have been the first camera to start recording and to transmit the start signal to other cameras. Similarly, the button or some other input can be actuated to send a stop signal to the other cameras. After a particular amount of time after receiving a stop signal or command, the cameras can enter a sleep mode in which the camera no longer transmits the stop signal and merely listens for a start signal (e.g., in a low power mode such as periodically checking for a start signal).

Some embodiments contemplate that a remote control can be used to start and stop the recording by the cameras. The remote control can be integrated in the camera, can be removable from the camera, or can be separate from the camera. For example, the remote control can be used to cause camera 10 or another camera to start recording video and to transmit the start signal. Some embodiments contemplate that the remote control can selectively start or stop individual cameras. For example, in the event that there are at least two groups of cameras that cannot communicate with each other, the remote control can get each group started or stopped independently.

Some embodiments contemplate that the cameras can inform each other or at least one camera as to the cameras in the camera network. This information can be passed shown on a display of one camera or on remote control, for example. The camera network information can be updated periodically or due to an event (e.g., pushing a button) and the updated information can be displayed, for example, as a list on a display of a camera or on a remote control, for example. This might allow, for example, for the selection of individual cameras from a list for starting or not starting. In the case of a separate remote control, the separate remote control might receive information about at least two separate camera networks. For example, the separate remote control might include a display listing the cameras in the different camera networks. The separate remote control can activate the cameras within range or can select individual cameras in the different camera networks to start recording and to transmit the start signal to the other cameras in the camera network as described above.

Some embodiments provide that the cameras are all in communication with one or more access points or base stations of a network. Accordingly, instead of or in addition to direct communications between cameras, the present disclosure also contemplates that the cameras wirelessly communicate with other cameras via one or more access points or base stations.

Some embodiments provide that the cameras of the wireless camera network 5 can be synchronized. In some embodiments, the cameras can be synchronized before deployment in the field. Thus, each camera can have the same internal time before being deployed in the field. In some embodiments, each camera can be synchronized in the field by accessing a global clock from a wireless source. For example, each camera can be access a wireless signal (e.g., a cellular signal, a GPS signal, etc.) that includes a time. Accordingly, each camera can have the same time or can be synchronized in the field. In some embodiments, each camera can synchronize by determining differences between the internal clocks of one or more other cameras. For example, camera 10 can send its internal clock time along with the start signal to cameras 20 and 30. Cameras 20 and 30 can adjust their internal clocks accordingly or can note the time difference for synchronization purposes.

Further, since the cameras deployed in the field are mobile, the cameras can periodically send out (e.g., broadcast) start signals in case cameras not already part of the wireless camera network enter the wireless range of the network cameras.

Some embodiments contemplate that the cameras can be attached to bows or other weapons during hunting, for example. In such a case, when a target is sited, one of the cameras can start recording images and/or video and cause the other cameras to start recording images and/or videos. Since the cameras are synchronized, the recordings are also synchronized. Each camera can time stamp its own images, frames, and/or videos. The images and/or videos can be combined to form a video showing different camera views at different times or multiple camera views at the same time. In some embodiments, multiple cameras can be set up to provide different fields of view and/or perspectives of a target location with at least one camera set up on a bow or other weapon. Thus, when a target moves within the target location, the hunter can then activate the wireless camera network 5 by starting to record on the camera on the weapon. Thus, the cameras can record the action from multiple perspectives with possibly different fields of view. Some embodiments contemplate that the cameras include software and/or apparatus or accessory (e.g., stabilizer) configurations to steady the picture and/or video being taken and/or stored whilst the cameras are being moved (e.g., while the user is walking or scanning) or shaken (e.g., during the recoil of a gun).

Because the cameras are synchronized, the synchronized images and/or videos can be combined later to provide different camera views at different times or multiple camera views (e.g., separate display windows, picture-in-picture, etc.) at the same time. Some embodiments contemplate that the various synchronized videos be combined into a single stream (e.g., with multiple channels). Thus, during playback, a view can seamlessly switch (e.g., toggle) between the various video streams by displaying the various video streams. Such playback also contemplates changing the speed of the video and enlarging or enhancing the frame. In some embodiments, the video can be provided that slows or stops the action at a particular time and provides multiple different views in succession, for example, of the particular time.

Although discussed with respect to hunting and attaching some of the cameras to weapons, the present disclosure need not be some limited. The cameras can be hand held or can be mounted on various objects (e.g., hats, vehicles, clothing, trees, buildings, tripods, etc.) The cameras can be mobile and/or fixed.

Figure 2:
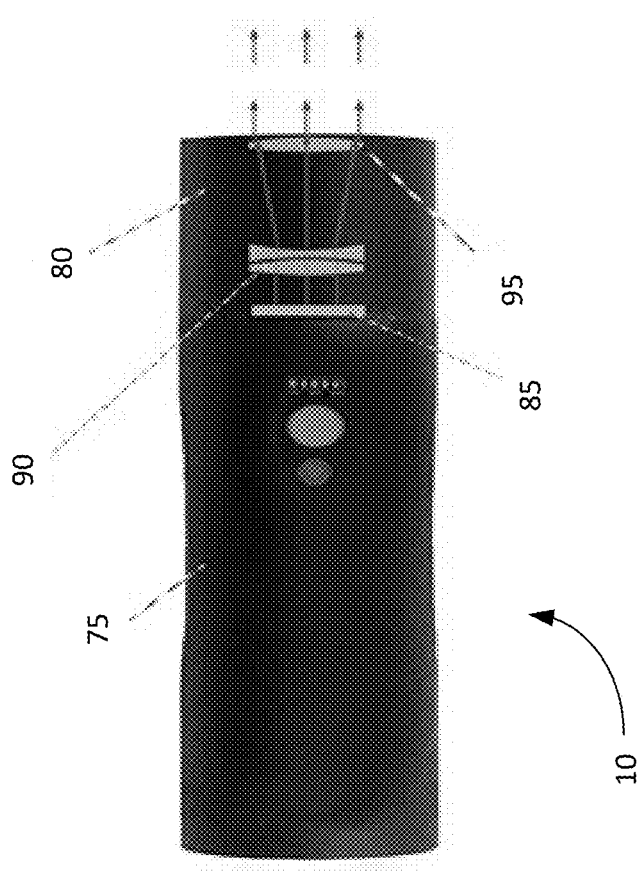
FIG. 2 shows an embodiment of a camera according to the present disclosure.

Referring to FIG. 2, an embodiment of camera 10 is shown. The housing 75 can be configured to house circuitry (see, e.g., some circuitry shown in FIG. 3), a battery (not shown), lenses 90 and 95, an image sensor 85, and various camera inputs and outputs (e.g., data ports, screens, lights, touch-sensitive displays, buttons, microphones, etc.). By actuating a button or other input, camera 10 starts to record images and/or video, and wirelessly transmits a start signal that can be received by other cameras within the wireless range 15 as discussed above.

FIG. 3 shows some of the circuitry 110 that may be housed by the housing 10. The circuitry 110 can include, for example, a processor 120, a memory 130 (e.g., a non-transitory memory), inputs 150, outputs 160, and a transceiver 170. The various components of the circuitry 110 can be connected by one or more buses 140. The circuitry 110 can be powered by one or more batteries (e.g., rechargeable batteries) that are not shown. The circuitry 110 can also include recharging circuitry when the circuitry 110 is connected to a power source (e.g., another battery, a wall outlet, a charger, etc.)

The processor 120 can include, for example, one or more of the following: a central processing unit, a digital signal processor, a signal conditioner, a controller, a microcontroller, an encoder, a decoder, a communication processor, a graphics processor, etc. The processor 120 can also include, for example, analog-to-digital converters and/or digital-to-analog converters.

The memory 130 can include, for example, one or more of the following: non-transitory memory, computer storage, volatile memory, non-volatile memory, rand access memory (RAM), read only memory (ROM, flash memory, solid state memory, semiconductor memory, electromagnetic memory, optical memory, hard drive, memory stick, memory card, etc. In some embodiments, the memory 130 can include memory that is removable such as a memory card for transferring memory contents from the camera 10 to a computer or a smart phone, for example. The same memory card or a different memory card can subsequently be inserted back into the camera 10. The memory 130 can, for example, store video, pictures, information, settings, and other data. The memory 130 can also store the initial, intermediate, and/or final results of calculations or algorithms performed by the processor 120. The memory 130 can also store code, software, and/or instructions that can be executed and/or run by the processor 120.

Inputs 150 can include, for example, one or more of the following: buttons, switches, touch-sensitive displays, microphones, sensors (e.g., motion sensors, infrared sensors, etc.), detectors (e.g., motion detectors, infrared detectors, etc.), receivers (e.g., infrared receivers, optical receivers, etc.), etc. that form part of the housing 10. The inputs 150 can also include, for example, the image sensor 85. A button or some other input of the inputs 150 can be actuated to cause the camera 10 to start recording images and/or videos and to wirelessly transmit a start signal.

Outputs 160 can include, for example, one or more of the following: touch-sensitive displays, screens, lights, light emitting diodes (LEDs), liquid crystal displays (LCDs), speakers, lasers, infrared lights, etc.

The transceiver 170 can include one or more transceivers that are configured for wired and wireless communication. For example, the transceiver 170 can be configured to be connected to a cable or wire such as an Ethernet cable, a digital subscriber line (DSL), an optical cable, etc. The transceiver 170 can also be configured to connect to one or more antennas for wireless communication such as cellular communication, WiFi communication, IEEE 802.11-compliant communication, Bluetooth communication, WiMax communication, multiple-input-multiple-output (MIMO) communication, radio communication, etc. In some embodiments, the transceiver 170 can be configured for direct communication (e.g., wired and/or wireless communication) with another device (e.g., a transceiver 170 in another camera 5, a storage device, a computer, a smart phone, a laptop, a tablet, etc.), or indirect communication (e.g., via a base station or an access point) with another device. In some embodiments, the transceiver 170 can include, for example, one or more of the following: a signal conditioner, an upconverter, a downconverter, etc.

In operation according to some embodiments, a button or some other input of the inputs 150 of the camera 10 is actuated. The processor 120 then starts to record, in memory 130, images and/or video received from image sensor 85, which receives images or video via the lenses 90, 95. The images and/or video can be stored in the memory 130 and/or stream or subsequently sent (e.g., wirelessly transmitted, sent over a cable, etc.) to another device for storage and/or processing. In addition to starting to record images and/or video, the processor 120 can start to wirelessly transmit a start signal through the transceiver 170. The start signal can be broadcast periodically. Further, in some embodiments, the start signal can include a time of the camera 10. The time can be an internal time of the camera 10 or a global time of the wireless camera network 5. If transceiver 170 of camera 10 receives a start signal from another camera and camera 10 is not part of the wireless camera network 5, then the processor 120 synchronizes with the time in the received start signal. In some embodiments, the processor 120 adjusts its internal clock to or determines the difference with the time in the received start signal, and then starts recording images and/or videos. The images and/or videos can be time stamped.

In some embodiments, the image sensor 85 converts the received image, which can be part of a picture or a video, into monochrome or multi-color pixel signals or data. The button can be used to start storing images and/or videos. Further, the same button (e.g., actuated multiple times) or a different button of the inputs 150 can be used to toggle the modes between image mode and video mode. Further, the same button or a different button of the inputs 150 can be used to start or stop the storing and processing of images and/or videos by the circuitry 110. In some embodiments, when in video mode, sounds are converted into analog or digital sound signals by a microphone of the inputs 150 which can be synchronized with the video.

In some embodiments, the image signal is sent from the image sensor 85, which can be part of the input 150 and processed by the processor 120. The processor 120 can store the image signal in the memory 150. In some embodiments, the processor 120 can receive analog signals from the image sensor 85 and convert the analog signal into a digital signal such as pixel data that is stored in the memory 130. In some embodiments, the processor 120 can receive the image signal from the image sensor 85 and convert that image signal into an image (e.g., a picture) format or file or a video format or file. In some embodiments, when the camera 10 is in video mode, sounds are converted into sound signals by a microphone of the inputs 150, which are then combined by the processor 120, with the video images received from the image sensor 85 before being stored in the memory 150.

In some embodiments, the memory 150 includes a removable memory such as a memory card that can be removed from the camera 5 and inserted into a computer, for example, to view the images or to play the videos. In some embodiments, the output 160 or the transceiver 170 includes a data port so that a computer, for example, can be connected to the camera 5 and the images and/or videos can be downloaded or streamed to the computer for storing and/or viewing. In some embodiments, the transceiver 170 can be used to transmit the images and/or videos to a computer over a wired connection (e.g., an Ethernet link) and/or a wireless connection (e.g., a Bluetooth link). The images and/or videos can be streamed or downloaded to a computer, for example.

In some embodiments, the outputs 160 can include a display, or a display can be connected to the output 160 or the transceiver 170. The processor 120, which can include a graphic processor and/or a graphic accelerator, can be used with the display to show the images and/or the videos stored in the memory 130. The outputs 160 can also include, for example, a speaker to play back sound in the stored video.

The present method and/or system can be realized in hardware, software, or a combination of hardware and software. The present methods and/or systems can be realized in a centralized fashion in at least one computing system, or in a distributed fashion where different elements are spread across several interconnected computing systems. Any kind of computing system or other apparatus adapted for carrying out the methods described herein is suited. A typical combination of hardware and software can be a general-purpose computing system with a program or other code that, when being loaded and executed, controls the computing system such that it carries out the methods described herein. Another typical implementation can include an application specific integrated circuit or chip. Some implementations can include a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes can be made and equivalents can be substituted without departing from the scope of the present method and/or system. In addition, many modifications can be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A wireless camera system, comprising:
a remote control comprising one or more input devices and a display; and
a wireless camera network comprising cameras including a first camera and a second camera in wireless communication with the first camera,
wherein the remote control is configured to present a list of the cameras in the wireless camera network;
wherein, in response to input received via the one or more input devices of the remote control, the remote control is configured to specify, from the presented list of cameras, a first subset of cameras for starting and a second subset from the presented list of cameras for not starting;
wherein, in response to input received via the one or more input devices, the remote control is configured to wirelessly transmit a first start signal; and
wherein, in response to receiving the first start signal from the remote control and being in the first subset of cameras for starting, the first camera and the second camera are configured to record images or video to a respective memory of the first camera and the second camera, and wirelessly transmit a second start signal so as to initiate recording images or video by a third camera of the first subset not in range of the remote control.

2. The wireless camera system of claim 1, wherein:
the third camera is within range of the second camera; and
in response to receiving the second start signal, the third camera is configured to record images or video to a memory of the third camera.

3. The wireless camera system of claim 2, wherein the first camera, the second camera, and the third camera provide recorded images or video of different fields of view or perspectives of a target location forming a single stream with multiple channels corresponding to the first camera, the second camera, and the third camera.

4. The wireless camera system of claim 2, wherein the recorded images or video from the first camera, the second camera, and the third camera are combined to form a single stream with multiple channels.

5. The wireless camera system of claim 1, wherein one or more input devices of the first camera includes a button that, in response to being depressed, causes the first camera to record the images or video and to wirelessly transmit the second start signal.

6. The wireless camera system of claim 1, wherein the first start signal includes a time used to synchronize the first camera and the second camera.

7. The wireless camera system of claim 1, wherein the first camera is mounted on a bow.

8. The wireless camera system of claim 1, wherein the first camera informs the remote control as to the cameras in the wireless network so that the remote control may present the list of cameras via the display.

9. The wireless camera system of claim 1, wherein:
the cameras of the wireless camera network periodically update the remote control with information regarding the cameras in the wireless camera network; and
the remote control presents the list of cameras in the network per the periodically updated information.

* * * * *